United States Patent
Cali et al.

(10) Patent No.: US 7,967,121 B2
(45) Date of Patent: Jun. 28, 2011

(54) STRUT BASED OVERRUNNING DRIVES

(75) Inventors: Connard Cali, Dublin, CA (US); Carlos Ferreira, Santa Catarina (BR)

(73) Assignee: Conntechnical Industries, Inc., Pleasanton, CA (US)

( * ) Notice: Subject to any disclaimer, the term of this patent is extended or adjusted under 35 U.S.C. 154(b) by 729 days.

(21) Appl. No.: 12/033,866

(22) Filed: Feb. 19, 2008

(65) Prior Publication Data

US 2008/0196990 A1   Aug. 21, 2008

Related U.S. Application Data

(60) Provisional application No. 60/890,517, filed on Feb. 19, 2007.

(51) Int. Cl.
*F16D 41/12* (2006.01)
*F02N 15/00* (2006.01)

(52) U.S. Cl. ............... 192/42; 192/46; 192/69.1; 74/7 C (58) Field of Classification Search .................. 192/69.1
See application file for complete search history.

(56) References Cited

U.S. PATENT DOCUMENTS

| | | | |
|---|---|---|---|
| 4,488,054 A | | 12/1984 | Ebihara |
| 4,592,243 A | * | 6/1986 | Katoh et al. ............... 74/7 E |
| 4,985,637 A | * | 1/1991 | Isozumi ................. 290/48 |
| 5,139,463 A | | 8/1992 | Bytzek et al. |
| 5,156,573 A | | 10/1992 | Bytzek et al. |
| 5,597,057 A | | 1/1997 | Ruth et al. |
| 5,722,909 A | | 3/1998 | Thomey |
| 5,839,318 A | | 11/1998 | Kimura et al. |
| 5,855,263 A | * | 1/1999 | Fergle .................. 192/46 |
| 5,918,715 A | | 7/1999 | Ruth et al. |
| 5,979,627 A | | 11/1999 | Ruth et al. |
| 6,062,362 A | * | 5/2000 | Costin et al. ............ 192/46 |
| 6,083,130 A | | 7/2000 | Mevissen et al. |
| 6,089,112 A | | 7/2000 | Kelly et al. |
| 6,116,394 A | | 9/2000 | Ruth |
| 6,186,299 B1 | | 2/2001 | Ruth |
| 6,647,812 B2 | * | 11/2003 | Nito et al. ................. 74/6 |
| 6,761,656 B2 | | 7/2004 | King et al. |
| 7,770,706 B2 | * | 8/2010 | Cali et al. ............... 192/42 |

OTHER PUBLICATIONS

International Search Report and Written Opinion mailed on Jul. 10, 2008 for PCT Application No. PCT/US2008/054331.
Office Action from the U.S. Patent and Trademark Office mailed Jan. 28, 2010 for U.S. Appl. No. 11/839,294.

* cited by examiner

*Primary Examiner* — Richard M. Lorence
(74) *Attorney, Agent, or Firm* — Alan Taboada; Moser IP Law Group (57) ABSTRACT

Embodiments of the present invention include strut based overrunning drives that provide one or more of greater durability, lower heat generation, high torque loads carrying capability, and/or ease of end of life assessment. In some embodiments, a drive assembly may include a shaft; a pocket plate disposed about the shaft and having a plurality of pockets formed on a first side thereof; a notch plate disposed about the shaft adjacent the pocket plate, the notch plate having a plurality of notches formed on a side of the notch plate facing the pockets of the pocket plate; a plurality struts disposed in the pockets; a resilient member disposed within the pockets and biasing the struts towards the notches; and a drive surface rotationally coupled to one of the pocket plate or the notch plate, wherein the other of the pocket plate or the notch plate is rotationally coupled to the shaft.

12 Claims, 10 Drawing Sheets

| COMPARISON TABLE | ROLL CLUTCH PULLEYS | SPRING DECOUPLER PULLEYS | STRUT PULLEY |
| --- | --- | --- | --- |
| FLUCTUATION ABSORBING | NO (ONE-WAY POWER CLIPPING) | YES | YES |
| TUNABLE TO SPECIFIC FREQUENCIES | NO | YES | YES |
| OVERRUNNING SPEED | ALTERNATOR > PULLEY | ALTERNATOR = PULLEY | ALTERNATOR = PULLEY |
| PHASE DIFFERENCE | NO | YES | YES |
| LOAD SENSITIVITY | YES | NO | NO |
| MATERIAL OPTIONS | HEAT TREATED STEEL | STEEL | STEEL, ALUMINUM, THERMOPLASTICS, THERMOSETS |
| EASE IN PROJECTING BALANCE OF LIFE STATUS | DIFFICULT | VERY DIFFICULT | EASY |
| HEAT GENERATION | HIGH | HIGH | LOW |
| TORQUE LIMITING (REPEATABLE) | NO | NO | YES |
| LOAD CARRYING POTENTIAL | LOW | MEDIUM | HIGH |
| ROTATIONAL INERTIA | HIGH | HIGH | LOW |
| EASE OF REBUILDING | MEDIUM (REGRIND AND REPLACE COMPONENTS) | DIFFICULT (REPLACE SPRING AND CLUTCH MATERIAL) | EASY (REPLACE STRUTS ONLY) |

FIG. 9

| CHARACTERISTICS TABLE | ROLL DRIVE | STRUT DRIVE |
|---|---|---|
| DROP-IN REPLACEMENT | YES | YES |
| STRESS TO RADIAL FORCE | 99% | 25% |
| STRESS TO USEFUL TORQUE | 10% | 96% |
| OVERRUN LIFE | SHORT | LONG |
| OVERRUN SPEED (LONG TERM) | (FAIL) | 15,000 + RPM |
| SENSITIVITY TO VIBRATION | HIGH | LOW |
| POSITIVE LOCK DESIGN | NO | YES |
| TORSIONAL WINDUP AND IMPACT | YES | NO |
| HEAT GENERATION | HIGH | LOW |
| NOISE LEVEL | MEDIUM | SILENT |
| FUNCTIONAL TORQUE CAPACITY | 43.2 FT. LBS | > 118.7 FT. LBS |

STRUT BASED OVERRUNNING DRIVES

CROSS-REFERENCE TO RELATED APPLICATIONS

This application claims benefit of U.S. provisional patent application Ser. No. 60/890,517, filed Feb. 19, 2007, which is herein incorporated by reference.

BACKGROUND OF THE INVENTION

1. Field of the Invention

Embodiments of the present invention generally relate to torque load transfer, limitation, and vibration dampening device designs.

2. Description of the Related Art

The increase in power features in vehicles continues to increase power demands from the vehicle's electrical system. As a result, charging and starting units and hybrid motor designs have incrementally increased amperage output to over 200 amps.

The larger starters and alternators combined with more complex engine accessories now found in the serpentine belt system, lead to rotational torque load spikes. These spikes are transferred to the alternator via its pulley. If either not dampened or too high, they can potentially damage the charging unit or other components in the belt system, including the belt itself.

To mitigate some of these problems, vibration dampening pulley designs have been conceived and implemented in charging units. Likewise, larger roll clutch or specially heat treated roll clutch drives have been attempted to carry the larger torque loads. A prominent pulley design relies on the use of a roll clutch mechanism to overrun and absorb loads. Another prominent pulley design relies on the use a combination coil spring and phenolic friction clutch mechanism to overrun and absorb loads.

However, neither of these designs have proven sufficiently durable for the noted applications. The roll clutch design requires high quality heat treated alloy steel components, tends to overheat and fail after extended overrun conditions, and slips under permanent mechanical deformation when faced with frequent, high torque loads.

The spring and friction clutch mechanism is complex in design, tends to early spring fatigue failures, builds up heat and cracks the clutch mechanism, and is nearly impossible to ascertain its remaining end of life balance without scrupulous technical inspection of the spring metallography and phenolic material conditions.

Thus, a need exists for a simple design that may offer one or more of greater durability, lower heat generation, capability of carrying high torque loads, potentially tunable vibration dampening, tunable to maximum permissible torque loads before elastic (repeatable) slippage, and/or ease of end of life assessment.

SUMMARY OF THE INVENTION

Embodiments of the present invention include strut based overrunning drives that provide one or more of greater durability, lower heat generation, high torque loads carrying capability, and/or ease of end of life assessment. In some embodiments, a drive assembly may include a shaft; a pocket plate disposed about the shaft and having a plurality of pockets formed on a first side thereof; a notch plate disposed about the shaft and adjacent the pocket plate, the notch plate having a plurality of notches formed on a side of the notch plate facing the pockets of the pocket plate; a plurality struts disposed in the pockets; a resilient member disposed within the pockets and biasing the struts towards the notches; and a drive surface rotationally coupled to one of the pocket plate or the notch plate, wherein the other of the pocket plate or the notch plate is rotationally coupled to the shaft.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The drawings depicted herein are simplified for ease of understanding and may not be drawn to scale. Similar reference numerals used between the drawings indicate identical or similar components.

DETAILED DESCRIPTION

Embodiments of the present invention include strut based overrunning pulleys that provide one or more of greater durability, lower heat generation, high torque loads carrying capability, potentially tunable vibration dampening, tunable to maximum permissible torque loads before elastic (repeatable) slippage, and/or ease of end of life assessment. Such pulley designs may be used in such non-limiting applications as industrial conveyor systems, starting and/or charging (alternators & hybrid) systems in engines and motors, or the like.

The pulley designs disclosed herein are based on low-mass rectangular struts. The struts are positioned between a plate with pockets for the retracted struts and a second plate with notches for the strut engagement. The struts may be planar (perpendicular to the axis of rotation) or radial (parallel to the axis of rotation).

The struts have a very high ratio of contact area to mass, yet are slim enough to achieve full engagement with a low degree of pivot. The low mass, rectangular construction, and lengthwise pivoting axis of the struts give them a very low moment of rotational inertia.

Further, a viscous wall of lubricant is dynamically created during even low overrun speeds, compressing the struts against their support springs, and effectively parking the struts into their respective pockets, away from any contact with the notch plate.

Figure 1:
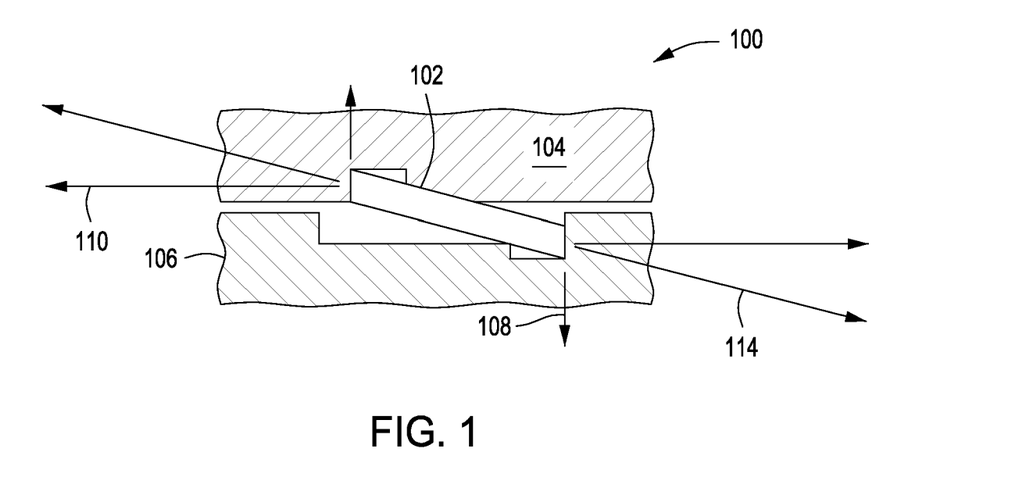
FIG. 1 depicts a partial view of a strut-based overrunning pulley in accordance with some embodiments of the invention.

For example, FIG. 1 depicts a partial side view in cross-section illustrating the operation of a strut based overrunning pulley 100 in accordance with some embodiments of the present invention. The pulley 100 includes a notch plate 104 and a pocket plate 106 having one or more struts 102 disposed therebetween. The notch plate 104 and the pocket plate 106 may be fabricated from the same or different materials and may be fabricated from at least one of metals (such as steel, aluminum, or the like), plastics, thermoplastics, thermosets, resins, or the like. The notch plate 104 and the pocket plate 106 may be mounted to a shaft (not shown) and are configured to rotate independent of each other when the struts 102 are not engaged. One of the notch plate 104 or the pocket plate 106 is rotationally fixed to the shaft and the other of the notch plate 104 or the pocket plate 106 is rotationally decoupled from the shaft. The component that is rotationally decoupled from the shaft is typically coupled to another body, such as a grooved or flat pulley body, a gear, a sprocket, or the like.

Thus, when the notch plate 104 and the pocket plate 106 rotate with respect to each other in a direction opposite the drive direction (such as in an overrun condition), the struts 102 do not engage with the notches. However, when the notch plate 104 and the pocket plate 106 begin to rotate with respect to each other in the opposite direction (the drive direction), the struts 102 quickly engage with the notches and rotationally couple the notch plate 104 and the pocket plate 106, and thereby the elements coupled to the notch plate 104 and the pocket plate 106 (e.g., a shaft and a pulley or other drive component).

The struts 102 may be fabricated from metals (such as steel, aluminum, powdered metals, or the like), plastics, thermoplastics, thermosets, resins, or the like, and sit in corresponding recesses, or pockets, formed in the pocket plate 106. A spring, or other mechanism, (not shown in FIG. 1) biases one end of the struts 102 out of the pocket and towards the notch plate 102. A plurality of notches are formed in the notch plate 104 to selectively engage with the struts 102.

When engaged, the strut 102 is compressed between the notch in the notch plate 104 and the pocket in the pocket plate 106, thereby rotationally coupling the shaft and the drive component (such as a pulley body) via the notch plate 104 and the pocket plate 106. The strut design is extremely efficient, developing only a small parasitic force 108. Thus, a large majority of the compressive force 114 applied to the struts 102 is converted to a driving force 110 of the assembly.

Figure 2A:
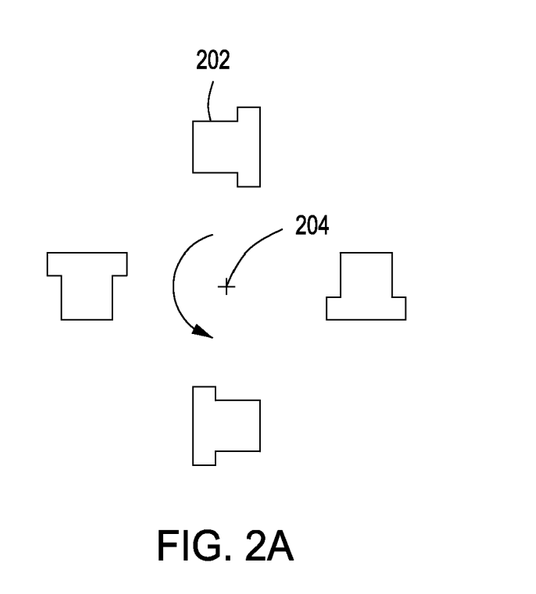
FIGS. 2A-B respectively depict planar and radial configurations of the struts of FIG. 1.
Figure 2B:
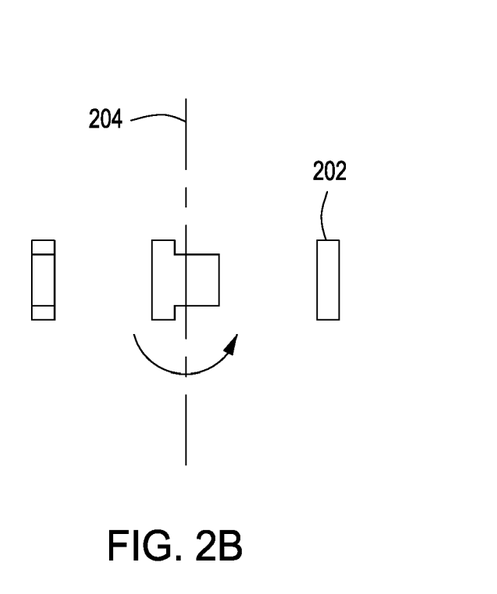

The strut based overrunning pulley designs of the present invention may be configured in either a planar or radial configuration. For example, FIG. 2A depicts a planar configuration of the struts. As shown in FIG. 2A, one or more struts 202 may be configured around an axis of rotation 204 such that the engagement surfaces of the struts 202 are substantially perpendicular to the axis of rotation 204 (e.g., the struts lie flat in a planar arrangement). Alternatively, for example, FIG. 2B depicts a radial configuration of the struts. As shown in FIG. 2B, the struts 202 may be configured around the axis of rotation 204 such that the engagement surfaces of the struts 202 are substantially parallel to the axis of rotation 204 (e.g., the engaging/disengaging motion of the struts is radial with respect to the axis of rotation).

As used herein, the terms notch plate and pocket plate refer to the components respectively having notches or pockets for the struts as described above. Such terms are contemplated to include components that have configurations that are not configured as plates, such as, for example, in radial strut configurations where the pockets and notches are radially configured about respective inner and outer diameters of mating components, as described in more detail below.

The strut based overrunning drive designs of the present invention have many embodiments. For example, FIGS. 3A-B respectively depict isometric exploded views of a radial strut-based overrunning drive 300 in accordance with some embodiments of the present invention. The drive 300 may be used, for example in a starter drive application, amongst others. The drive 300 includes a notch plate 304 and a pocket plate 306 having one or more struts 302 disposed therebetween for selectively rotationally coupling the notch plate 304 and the pocket plate 306 as described above with respect to FIG. 1. The number of struts 302 provided may be selected to provide a desired torsional load capacity for the overrunning pulley. In a non-limiting example, using a 6 mm wide by 2.3 mm thick rectangular strut made of carbon steel, an operational torque carrying limit of 59 ft-lbs was obtained using a single strut, 118.7 ft-lbs for two struts, and 177.8 ft-lbs for three struts. It is contemplated that greater numbers of struts may also be utilized. As a comparison, a conventional roll clutch having 7 steel rollers was found to have a calculated static torque carrying limit prior to roll clutch race failure of 43.2 ft-lbs.

Figure 3A:
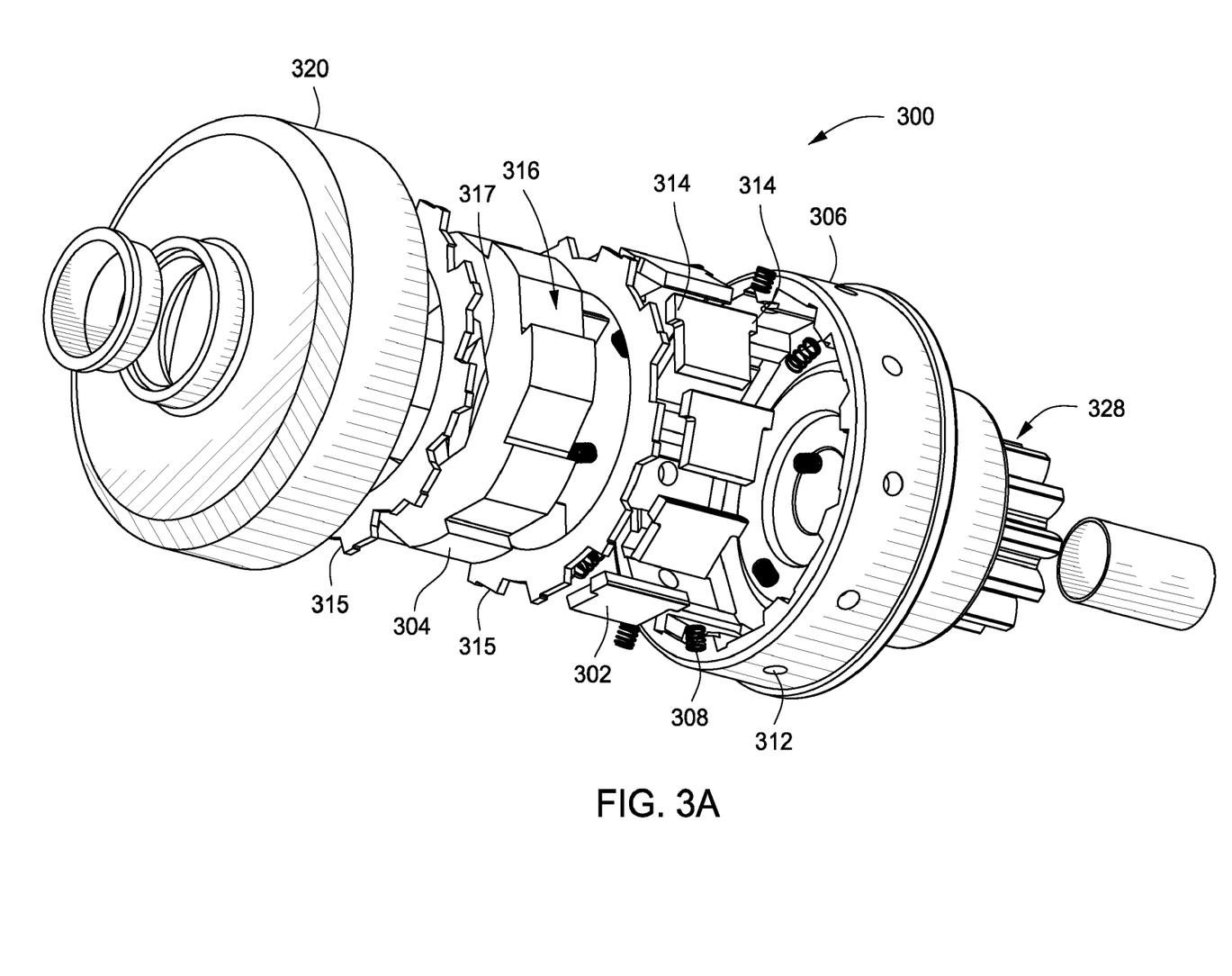
FIGS. 3A-B respectively depict isometric exploded views of a radial strut-based overrunning drive in accordance with some embodiments of the present invention.
Figure 3B:
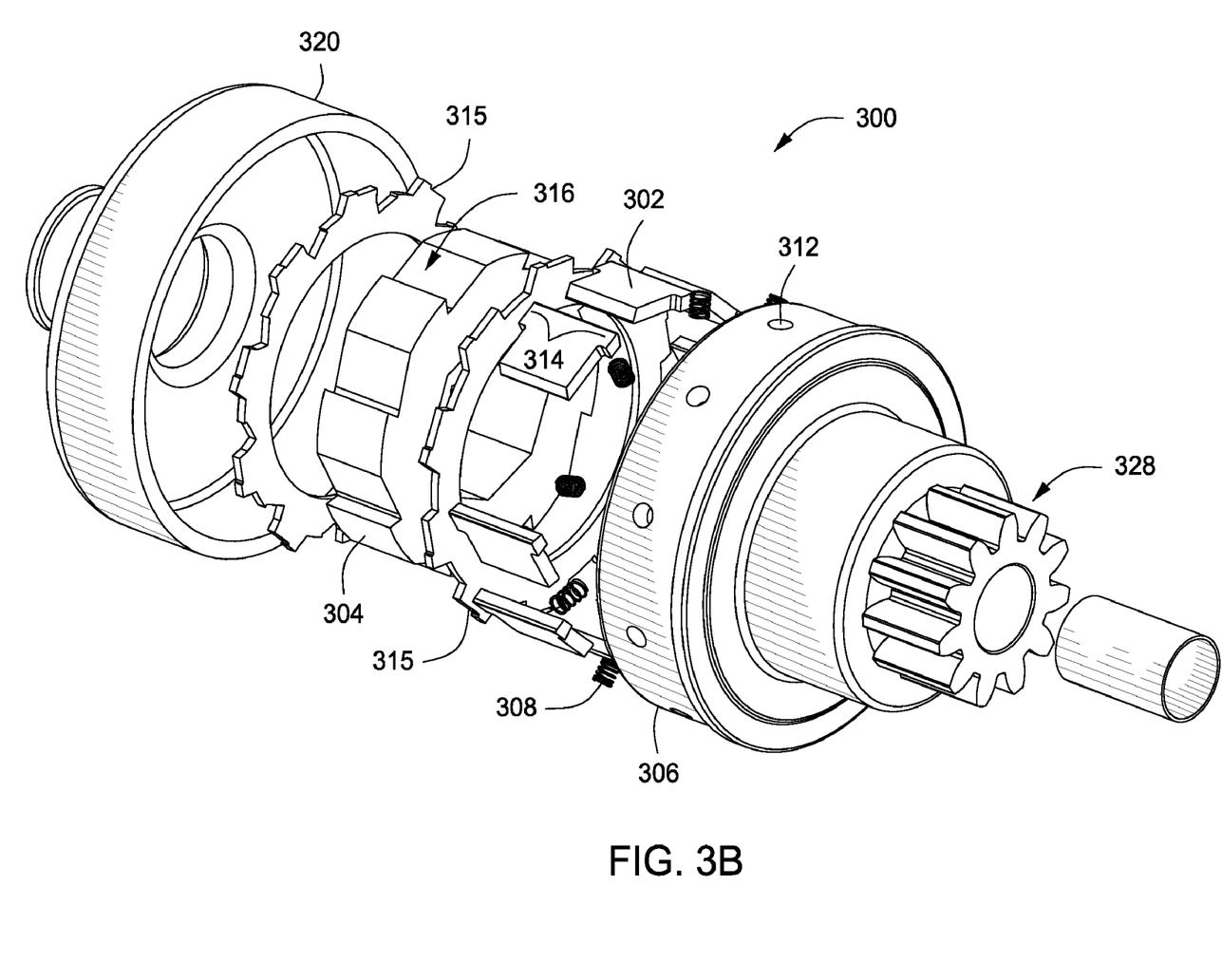

The notch plate 304 includes a plurality of notches 316 configured to selectively engage with an edge of the struts 302. The number and arrangement of the notches may be varied to control the degree of rotation of the notch plate 304 before the struts 302 become engaged. In some embodiments, the notches 316 may be configured to rotate between about 3 to 15 degrees prior to engagement of the struts 302 and the notches 316.

In some embodiments, one or more guide washers 315 (two guide washers 315 shown in the embodiment of FIGS. 3A-B) may be provided on either side of the notch plate 304 to facilitate retaining the struts 302 in place while allowing their movement into and out of the pockets 310. The guide washers 315 may have outwardly extending protrusions that may define recesses where a flange or protrusion 314 of the struts 302 may be held with the protrusions providing a surface against which the side edges of the strut 302 may be constrained to facilitate maintaining alignment of the struts 302.

The pocket plate 306 typically includes a corresponding pocket 310 for each strut 302. The struts 302 may comprise a feature, such as a flange or protrusion 314 to facilitate locating and locking the strut 302 in position in the pockets 310 of the pocket plate 306. The protrusion 314 acts as a pivot point about which the strut 302 may rotate, thereby facilitating the extension of the end of the struts 302 into and out of the notches 316 during operation, while retaining the struts 302 in position within the assembly. The struts 302 are outwardly biased with respect to the pockets 310 by a resilient element, such as springs, resilient members, or the like. For example, in the embodiment shown in FIGS. 3A-B, a spring 308 may be disposed in an opening 312 formed in the pocket 310 to bias an end of the strut 302 away from the pocket plate 306 and towards the notch plate 304. The opening 312 may be disposed only partially through the pocket plate 306, or as shown in FIG. 3, the opening 312 may extend through the entire pocket plate 306 and a cover 320 may be provided that includes an inner surface for the resilient element (e.g., spring 308) to rest against.

A drive shaft (not shown), for example from a starter motor, may be provided and may be rotationally fixed to one of the notch plate 304 or the pocket plate 306 for providing torque to components of the drive 300 (e.g., to one of the notch plate 304 or the pocket plate 306, and when struts are engaged, to both). In the embodiment shown in FIGS. 3A-B, the notch plate 304 may be coupled to the shaft by one or more features (such as a plurality of flat surfaces 317 formed on the inner diameter of the notch plate 304).

The drive 300 further includes a drive surface 328 for interfacing with a drive component for selectively transferring torque between the drive 300 and some other component (for example, a flywheel of an engine). For example, as shown in FIGS. 3A-B, the drive surface 328 is a pinion gear. It is contemplated that the drive surface 328 may be flat or have other configurations to interface with any other type of drive mechanism, such as belts, chains, gears, or the like. The drive surface 328 is typically rotationally coupled to the one of the notch plate 304 or the pocket plate 306 that is not coupled to the shaft 330. In the embodiment of FIGS. 3A-B, the drive surface 328 is machined in an end of the pocket plate 306. Alternatively, the drive surface 328 may be a separate component that is coupled to the pocket plate 306 (or other component of the drive 300 that may be selectively coupled to a source of torque). For example, the drive surface may be disposed on a second shaft (not shown) that is coupled to the pocket plate 306. It is contemplated that, alternatively, and in all embodiments described herein unless specifically excluded, the pocket plate 306 may be coupled to the drive shaft and the notch plate 304 may be coupled to the drive surface 328.

Figure 4A:
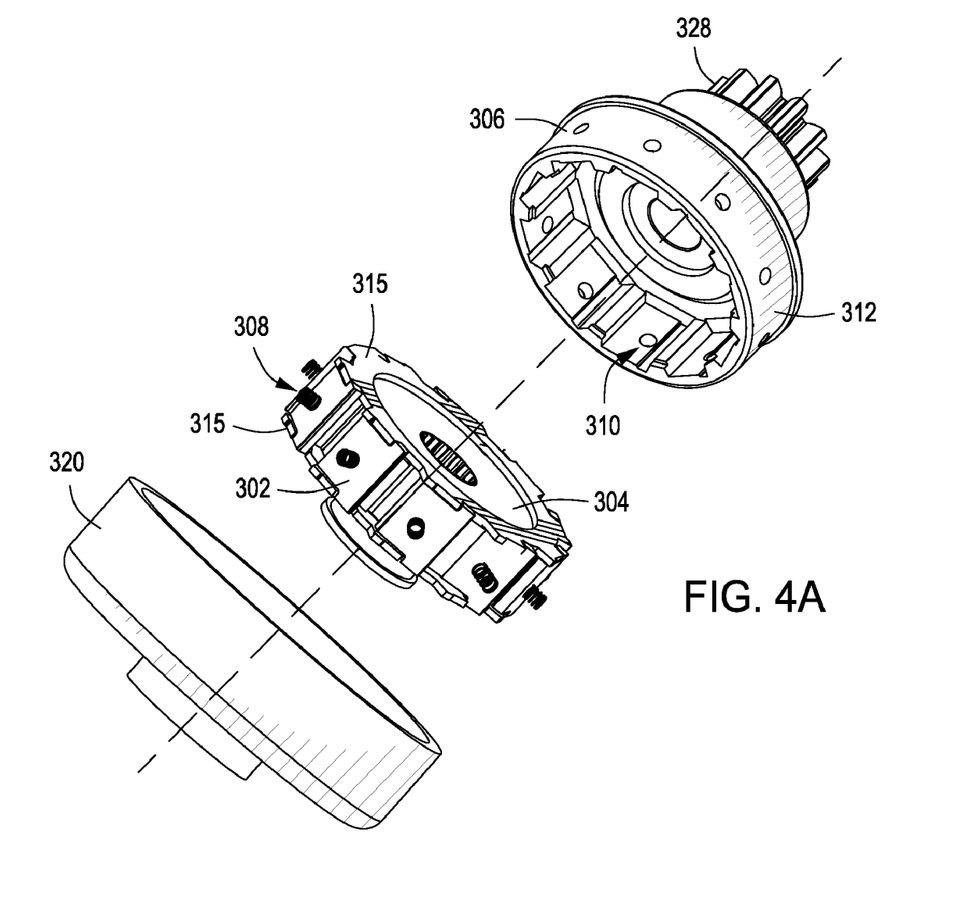
FIG. 4A depicts a partial exploded view of the radial strut-based overrunning drive of FIGS. 3A-B in accordance with some embodiments of the present invention.
Figure 4B:
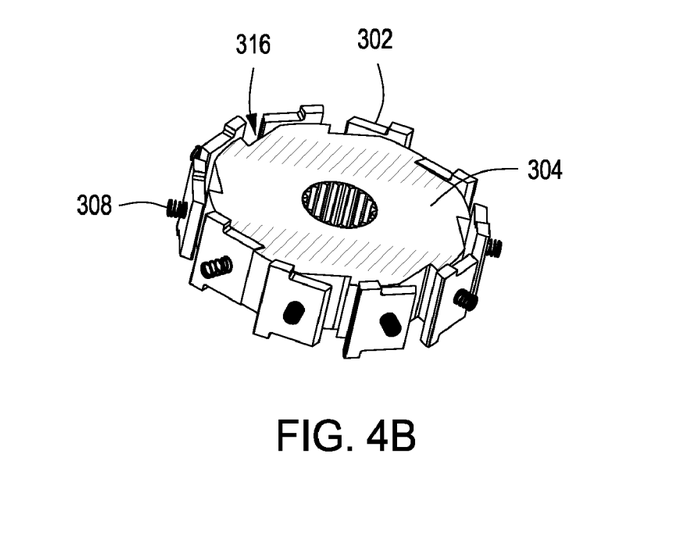
FIG. 4B depicts a detail of portions of the radial strut-based overrunning drive of FIG. 4A.

FIGS. 4A-B depict detailed partial views of the drive 300 depicted in FIGS. 3A-B. For example, FIG. 4A depicts an exploded view of the pocket plate 306, notch plate 304, and cover 320. The notch plate 304 is shown assembled with the struts 302 disposed thereabout and having a pair of guide washers 315 disposed on either side of the notch plate 304. FIG. 4B depicts the notch plate 304 assembly of FIG. 4A with one guide washer 315 removed to facilitate viewing of the relationship between the struts 302 and the notches 306 of the notch plate 304.

The drive 300, and the components thereof, may be fabricated, at least in part, from any robust material suitable for the particular application, such as phenolics, engineered resins, aluminum, steel, powdered metals, or combinations thereof. In some embodiments, the component rotationally coupled to the pulley body 326 (e.g., the notch plate 306 in the embodiment shown in FIGS. 3A-B) may be incorporated into a single piece assembly (for example, by being cast, molded, or machined from a single piece of material).

Embodiments of torque transfer assemblies as described herein may be utilized in numerous applications, such as starter drives, alternator systems, and other drive interfaces in automotive and non-automotive environments (such as motorized vehicles, hybrid vehicles, lawn mowers, industrial conveyor systems, and the like). In one non limiting example, any of the embodiments described herein may be utilized in a starter system of a motor. For example, a certain geometry interface—such as a spur gear, a helical gear, a rubber cylinder, or a pulley—may be juxtaposed to the engine's flywheel, in constant contact/mesh therewith. To start the engine, a solenoid would not be necessary to advance the starter's gear into mesh with the flywheel, as it is already meshed therewith. Thus, upon ignition, the starter's armature would be energized and rotate immediately, turning the struts into the notch plate, and rotating the in-mesh interface with the flywheel. Once the combustion engine's rotational speed is greater than the rotational speed of the starter motor, the struts would disengage and decouple from the notches of the notch plate. The boundary layer created by the grease/oil during overrun between the pocket and notch plate would push the struts down against the springs, and park the struts (e.g., decouple them) away from any contact with the notch plate. Thus, while the combustion engine is running, the only portion of the starting system that would be spinning would be the in-mesh component with the flywheel, since the rest of the starter is decoupled from that interface via the 'parked' struts (e.g., the rest of the starter is decoupled because the struts are not engaged).

Figure 5:
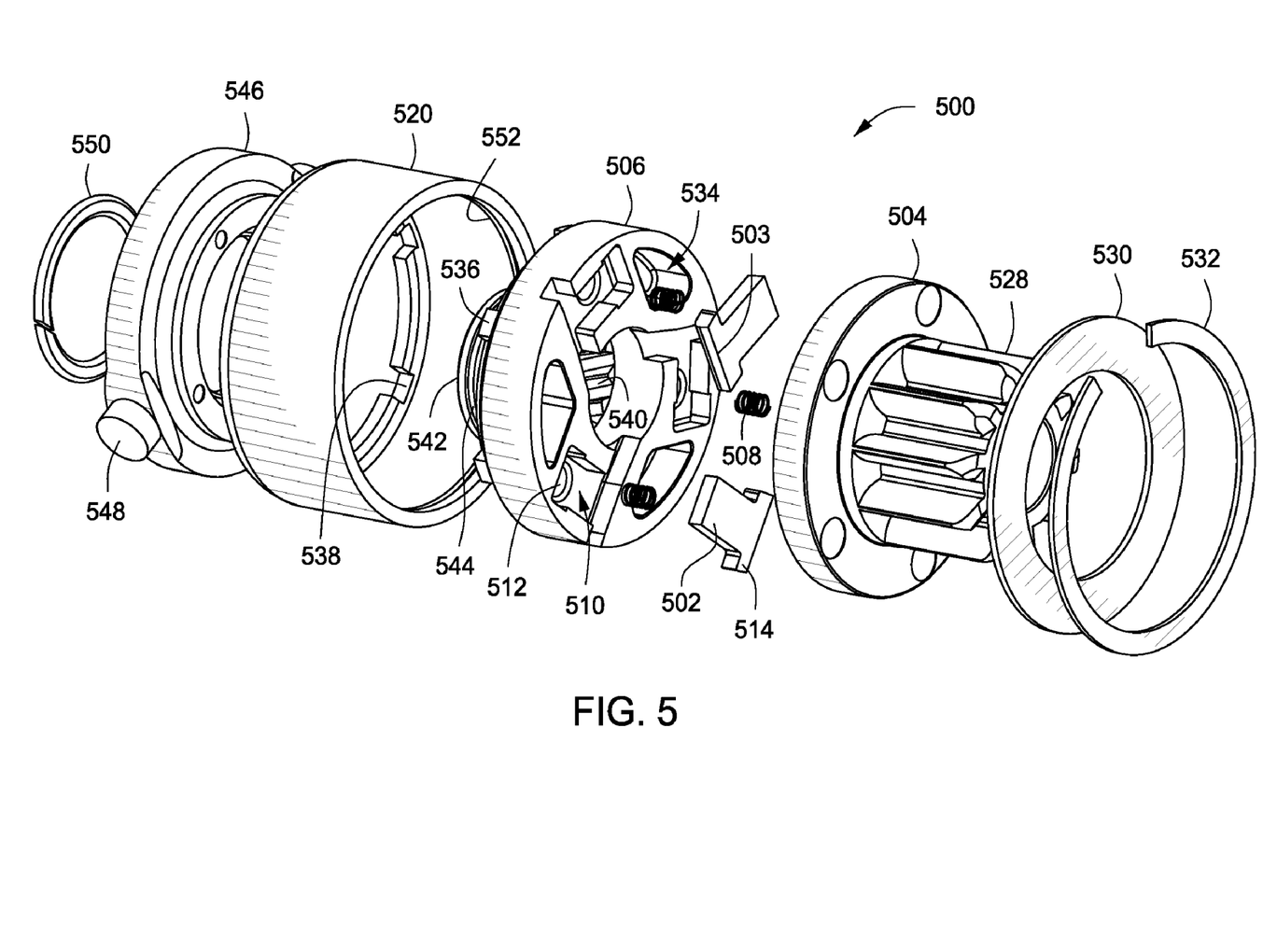
FIG. 5 respectively depicts an isometric exploded view of a planar strut-based overrunning drive in accordance with some embodiments of the present invention.
Figure 6A:
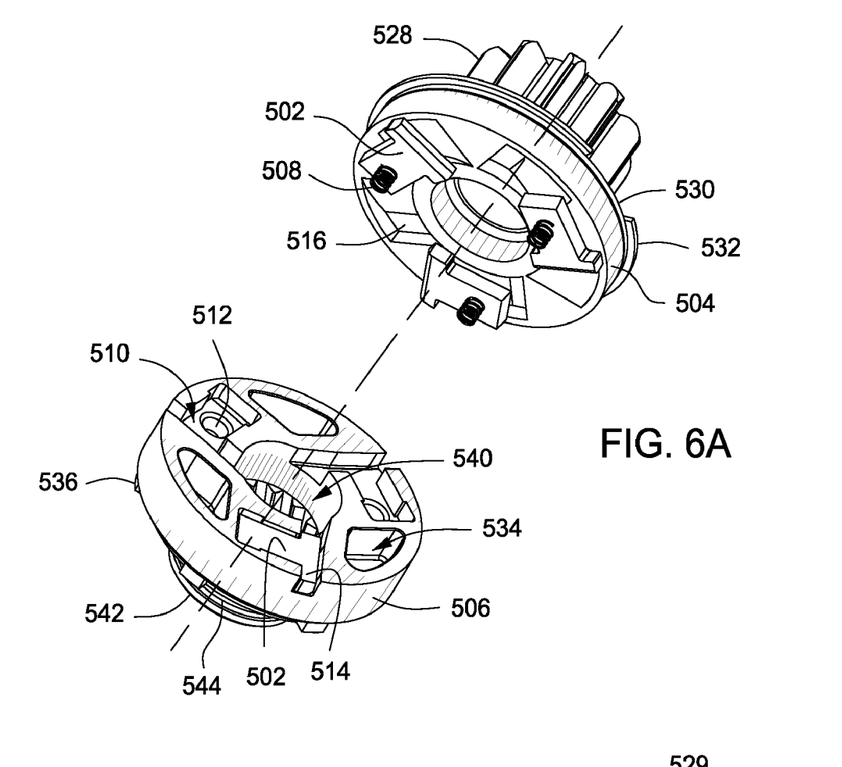
FIG. 6A depicts a partial exploded view of the planar strut-based overrunning drive of FIG. 5 in accordance with some embodiments of the present invention.
Figure 6B:
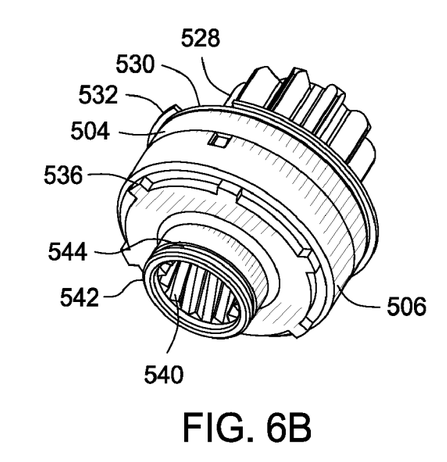
FIG. 6B depicts a detail of portions of the radial strut-based overrunning drive of FIG. 5.
Figure 6C:
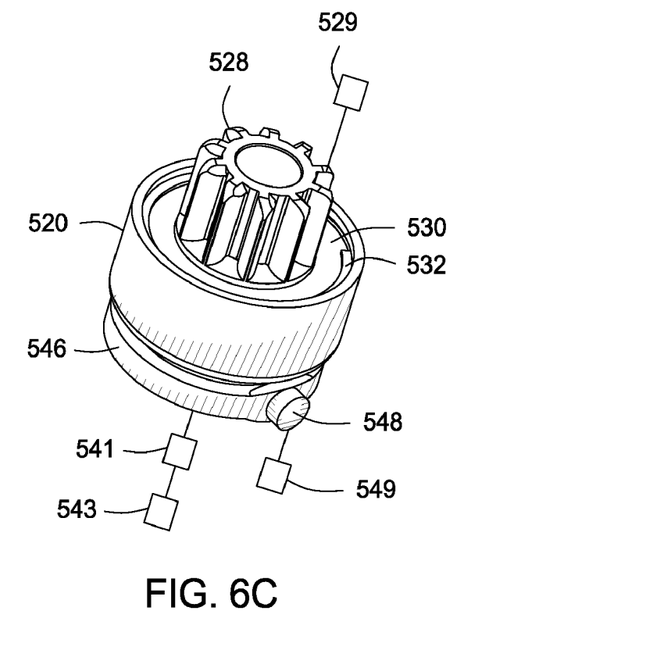
FIG. 6C depicts an isometric view of the assembled drive of FIG. 5

In some embodiments, a starter drive may move a drive gear into mesh with the flywheel of the engine while still advantageously utilizing the torque transfer mechanisms of the present invention. For example, FIG. 5 depicts an exploded isometric view of a planar strut-based overrunning drive 500 in accordance with some embodiments of the present invention. To facilitate understanding, FIG. 6A depicts a partial exploded view of the planar strut-based overrunning drive of FIG. 5, FIG. 6B depicts a partial assembly detail of portions of the radial strut-based overrunning drive of FIG. 5, and FIG. 6C depicts an isometric view of the assembled drive of FIG. 5. The following description may be best understood by referring to each of the above figures.

The drive 500 may include a notch plate 504, pocket plate 506, and struts 502 in a similar arrangement as discussed above. The notch plate 504 may have a plurality of notches (not shown in FIG. 5, labeled 516 in FIG. 6A) for selectively interfacing with the ends of the struts 502. The pocket plate 506 has a plurality of pockets 510 for receiving the struts 502. A plurality of holes 512 may be provided to receive springs 508 for outwardly biasing the struts 502 with respect to the pocket plate 506. One or more holes 534 may be provided in the pocket plate 506 to facilitating reducing the mass of the assembly. The pockets 510 may have a geometry selected to retain the struts 502 therein and to receive one or more flanges or protrusions 514 of the struts 502, as discussed above. In some embodiments, the struts 502 may further comprise a beveled edge 503 for engaging with the notches 516.

A housing 520 may be provided to fit over the assembly of the pocket plate 506, struts 502, and notch plate 504. A retaining washer 530 and lock ring 532 may be provided to secure the assembly together, the lock ring fitting in a corresponding groove 552 formed in the housing 520. The housing 520 may further include a feature (such as one or more recesses 538) that interfaces with a corresponding feature (such as protrusions 536) disposed on the pocket plate 506 to facilitate rotationally coupling the housing 520 and the pocket plate 506.

To interface with conventional starters, a shift fork ring 546 may be coupled to the housing 520 (and the torque transfer assembly contained therein) by sliding over a stem 542 extending from the pocket plate 506. The stem 542 may include a groove 544 formed therein for receiving a lock ring 550 that axially secures the shift fork ring 546 to the stem 542. A shaft (schematically represented by block 541 in FIG. 6C) may extend axially through the assembly and may interface with a feature formed on the inner diameter of the pocket plate 506 (such as helical splines 540).

The shift fork ring 546 typically includes one or more features (such as protrusions 548) for interfacing with a solenoid (schematically represented by block 549 in FIG. 6C) that selectively axially extends or retracts the drive 500. A drive surface 528 (such as a pinion gear as shown in FIG. 5) may be provided to selectively interface with another drive mechanism (such as a flywheel of an engine) via operation of the starter motor as discussed above.

In operation, engaging the starter motor (schematically represented by block 543 in FIG. 6C) actuates a starter solenoid (e.g., 549) that axially extends shift fork ring 546, and thereby the drive 500, such that the drive surface 528 engages with the flywheel of the engine (flywheel and engine schematically represented by block 529). The starter then drives a central shaft (e.g., 541) that is coupled to the pocket plate 506, for example, via the helical splines 540. The starter, rotating the pocket plate 506, causes the struts 502 to engage the notches 516 of the notch plate 504, thereby causing the drive surface 528 (and the flywheel of the engine) to rotate.

Figure 7:
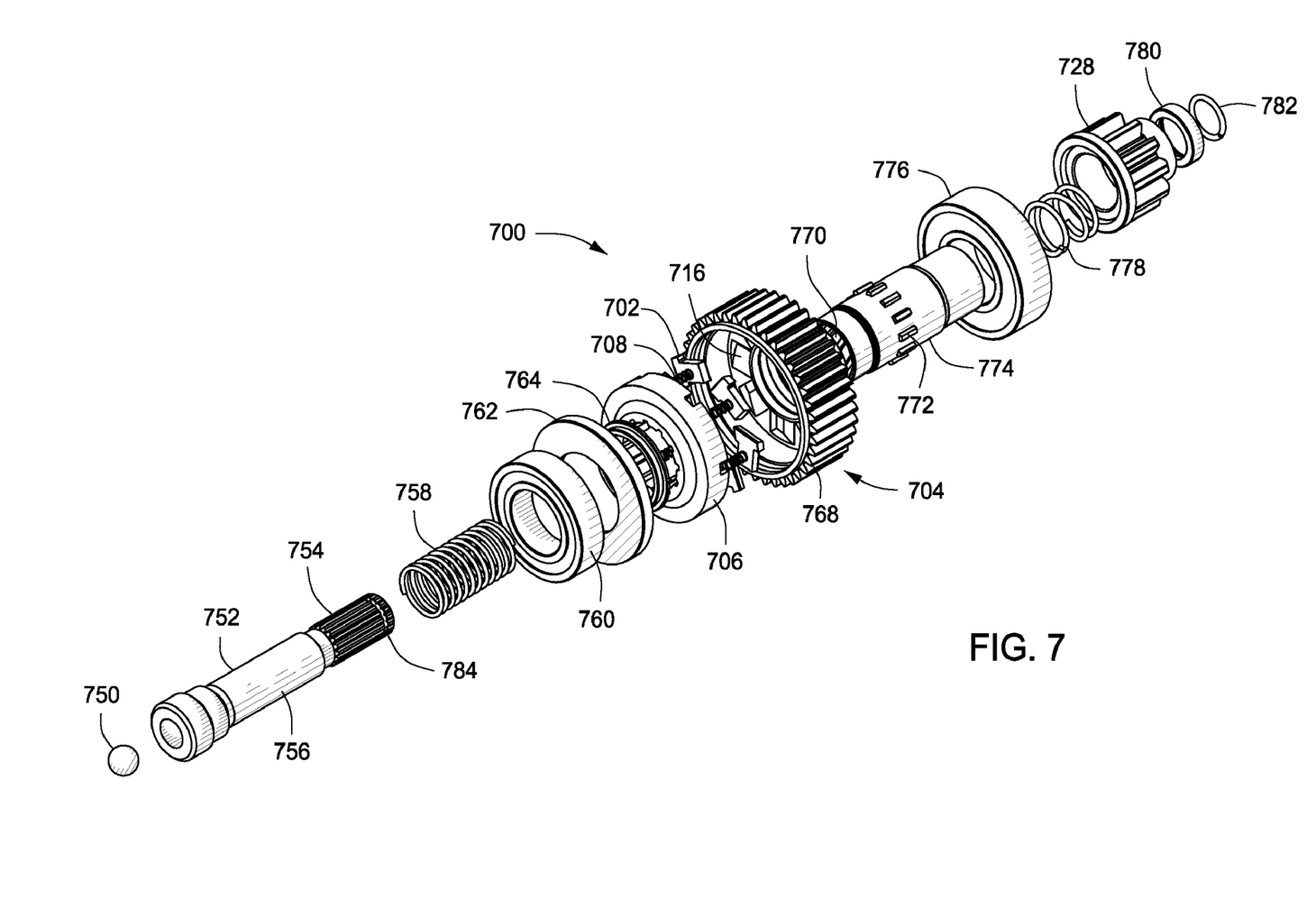
FIG. 7 depicts an isometric exploded view of a planar strut-based overrunning drive in accordance with some embodiments of the present invention.
Figure 8A:
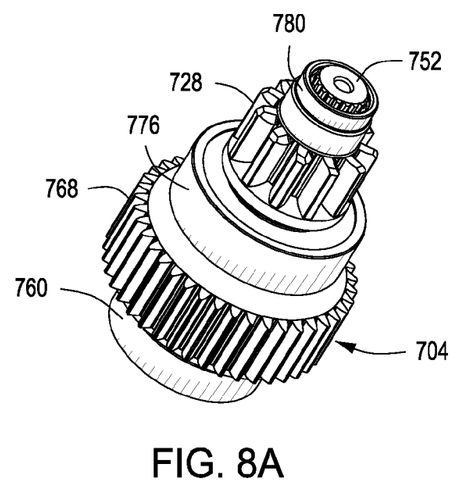
FIGS. 8A-E depict perspective partial-assembly views of the planar strut-based overrunning pulley of FIG. 7 in accordance with some embodiments of the present invention.
Figure 8B:
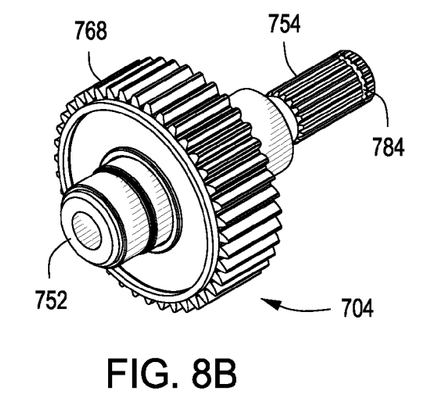
Figure 8C:
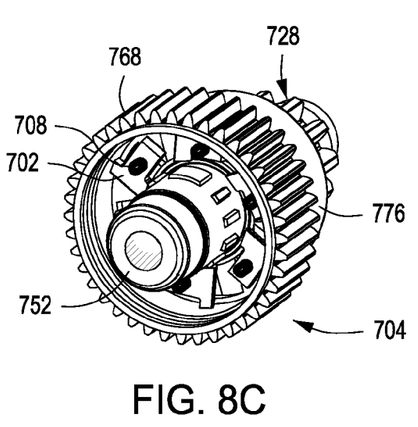
Figure 8D:
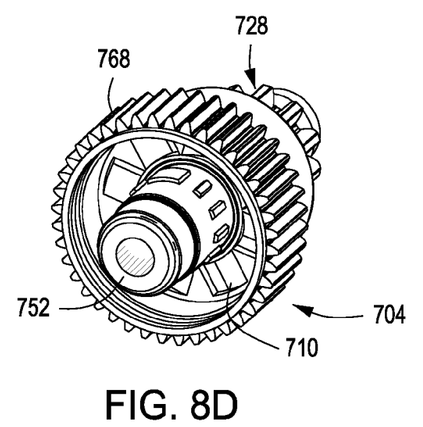
Figure 8E:
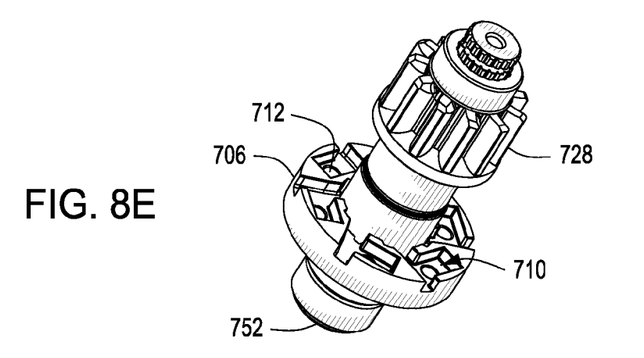

In some embodiments of the present invention, an offset gear reducing drive may be provided. For example, FIG. 7 depicts an offset gear reducing drive 700 incorporating a torque transfer mechanism as described above. To facilitate understanding, FIGS. 8A-E depict a partial isometric views of the offset gear reducing drive of FIG. 7. The following description may be best understood by referring to each of the above figures.

The offset gear reducing drive 700 may include a notch plate 704, a pocket plate 706 and a plurality of struts 702 disposed therebetween, similar to as discussed above. The notch plate 704 includes a plurality of notches 716 for selectively engaging ends of the struts 702. The struts 702 reside in pockets 710 of the pocket plate 706 and are biased outwards by springs 708 disposed in holes 712 formed in the pockets 710. The notch plate 704 may have an outer drive surface 768 (such as a toothed surface that forms a gear) that may be in permanent mesh with an offset idler gear (schematically represented by block 529 in FIG. 6C).

The pocket plate 706 includes a plurality of pockets 710 for housing the struts 702. A plurality of springs 708 may be disposed in a corresponding plurality of holes 712 formed in the pockets 710 of the pocket plate 706. A pocket floor washer 764 may be disposed adjacent the pocket plate 706 to provide a floor for the ends of the springs 708 to rest against. A flat washer 762 may be provided to facilitate sealing the torque transfer assembly. The pocket plate 706 is further rotationally coupled to a pocket plate torque shaft 774, for example, via a plurality of splines 772 that mate with corresponding features formed on the inner diameter of the pocket plate 706. To facilitate stability of the assembly, a bearing 776 may be disposed over one end of the pocket plate torque shaft 774 and a bearing 760 may be disposed over the other end of the pocket plate torque shaft 774.

A drive surface 728 (such as a pinion gear shown in FIG. 7) for selectively engaging a driven element (such as an engine flywheel) may be disposed at the end of the pocket plate torque shaft 774. A meshing spring 778 may be provided to axially bias the drive surface 728 towards the element to be driven. In some embodiments, the meshing spring may be disposed between the pocket plate torque shaft 774 and an inner recess of the drive surface 728.

A solenoid connecting rod 752 may extend axially through the assembly. A plurality of splines 754 may be provided to interface with mating splines formed in the inner diameter of the drive surface 728 (a pinion gear in the embodiment of FIG. 7). A bearing 780 may fit over the end of the solenoid connecting rod 752 with a lock ring 782 fitted in a groove 784 of the solenoid connecting rod 752 to lock the assembly together.

A solenoid connecting sphere 750 rests against the end of the solenoid connecting rod 752 to facilitate interfacing with the starter solenoid. A demeshing spring 758 may be disposed between, for example a shoulder on the pocket plate torque shaft 774 and a shoulder on the solenoid connecting rod 752 to facilitate providing a demeshing bias (e.g., an axial bias in a direction away from the element selectively coupled to the drive surface 728).

A plurality of helical splines (not shown) may be formed on a portion 756 of the solenoid connecting rod 752 to interface with mating helical splines 770 formed in the inner diameter of the pocket plate torque shaft 774 upon extension of the solenoid connecting rod 752 during operation.

In operation, upon engagement of the starter motor, the starter solenoid axially pushes the solenoid connecting rod 752 (up and to the right as drawn in FIG. 7), thereby rotationally coupling the solenoid connecting rod 752 to the torque transfer assembly via the helical splines 770 formed on the pocket plate torque shaft 774 and thereby engaging the drive surface 728 with the element to be driven (for example, a flywheel). If there is any tooth-to-tooth interference in the meshing of the drive surface 728 and the driven element, the meshing spring 778 provides axial freedom of movement and additional axial bias to facilitate the ultimate engagement of the drive surface 728 and the driven element.

Once the drive surface 728 is in mesh with the driven element, the solenoid contact of the starter closes and the armature of the starter begins to rotate the offset idler gear. The drive surface 768 of the notch plate 704, in mesh with the offset idler gear, as discussed above, will also begin to rotate and engage the struts 702 coupled to the pocket plate 706, thereby rotating the pocket plate torque transfer shaft 774 and, thereby, the drive surface 728.

Figure 9:
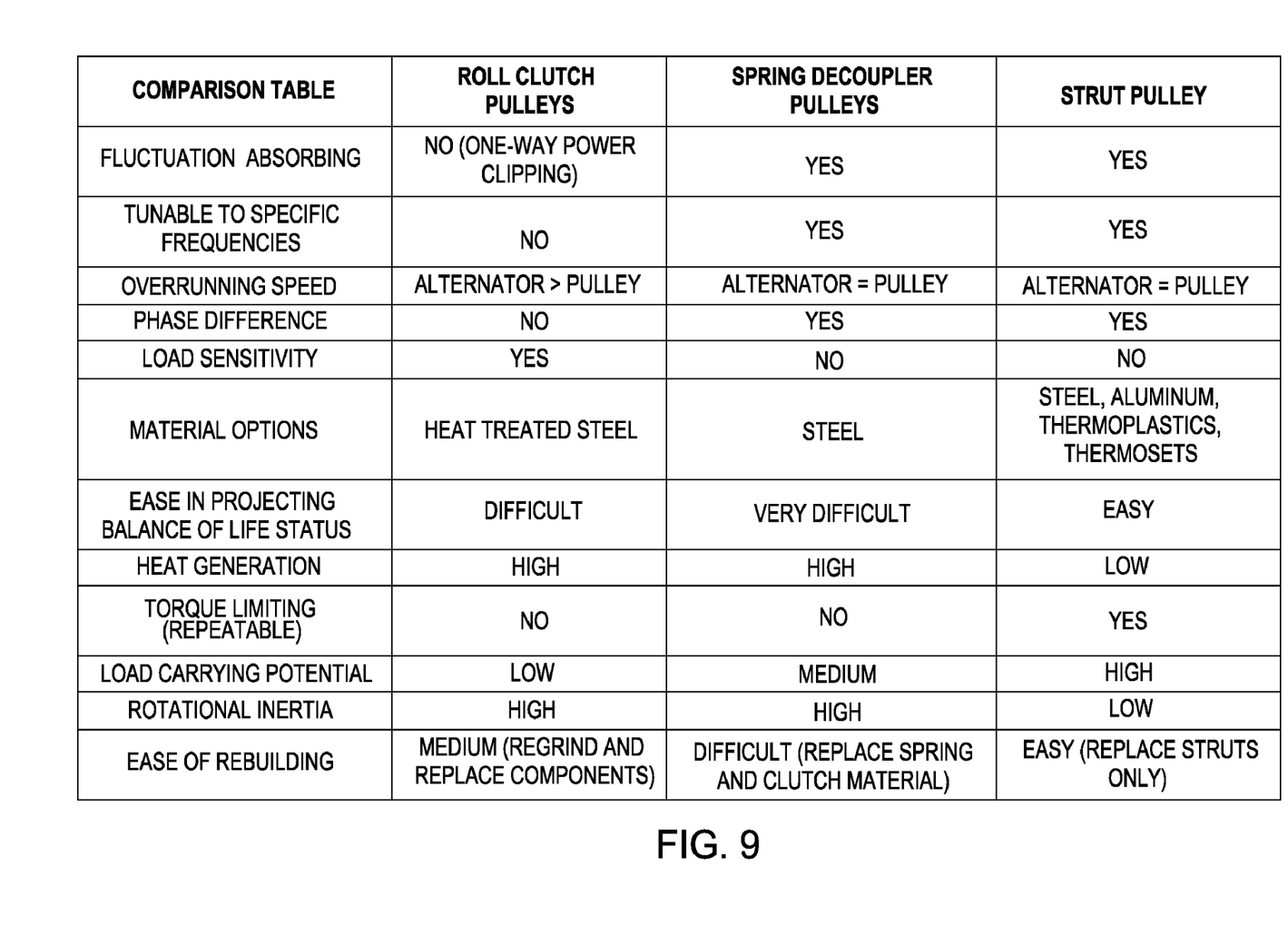
FIG. 9 depicts a table comparing conventional roll and spring decoupler pulleys versus strut pulleys in accordance with some embodiments of the present invention.

The strut based overrunning pulley designs in accordance with embodiments of the present invention provide for various improvements and enhancements as compared to conventional roll clutch, spring decoupler, and other conventional designs. For example, FIG. 9 is a table comparing conventional roll clutch pulleys and conventional spring decoupler pulleys with strut based overrunning pulleys in accordance with some embodiments of the present invention and showing the many varied advantages of the strut based pulleys as compared to the conventional designs.

Figure 10:
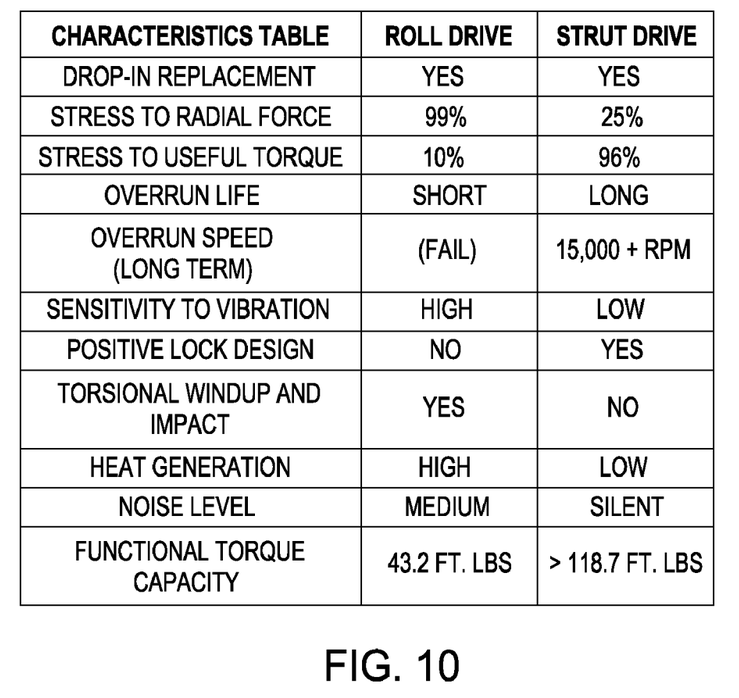
FIG. 10 depicts a table comparing characteristics of conventional roll drives versus strut drives in accordance with some embodiments of the present invention.

FIG. 10 is a table comparing a conventional roll drive (roll clutch pulley) with the strut drive (strut based overrunning pulley) in accordance with some embodiments of the present invention. As detailed in the table of FIG. 10, the strut drive has a very low stress to radial force and a very high stress to useful torque percentage (i.e., the strut configuration is very efficient). The strut drive has a long overrun life at high overrun speeds (>15,000 rpm), low sensitivity to vibration, a positive lock design, no torsional windup and impact issues, low heat generation, low noise generation, and a very high functional torque capacity as compared to the roll drive.

Figure 11:
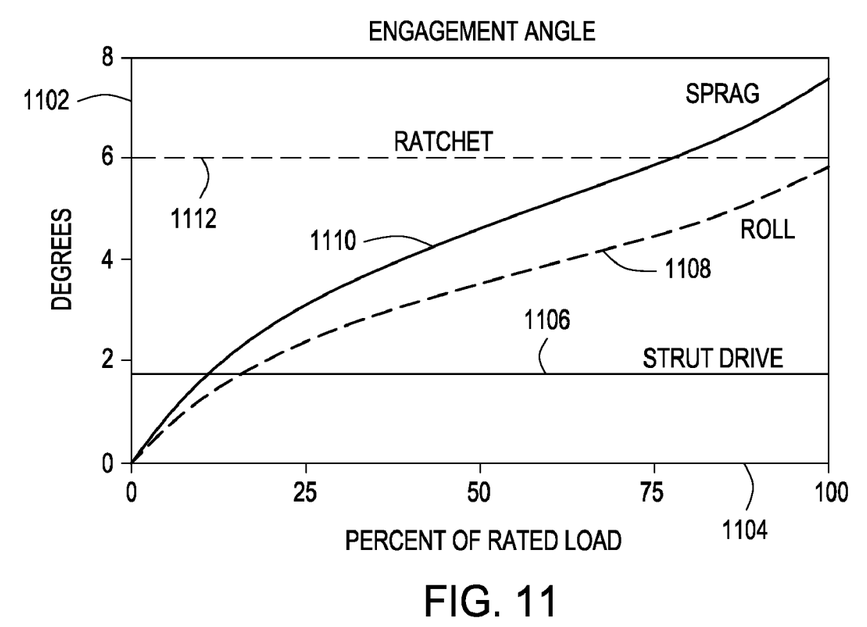
FIG. 11 depicts a graph comparing various drives versus strut drives in accordance with some embodiments of the present invention.

Moreover, the strut based overrunning pulleys of the present invention provide for 100 percent of rated load at a low engagement angle as compared to conventional drives of other designs. For example, FIG. 11 depicts a graph comparing engagement angle in degrees (axis 1102) versus percent of rated load (axis 1104) for strut drives (line 1106), roll drives (line 1108), sprag drives (line 1110), and ratchet drives (line 1112). As can be clearly seen from the graph, the strut drive provides 100 percent of the rated load at a low engagement angle, as well as providing 100 percent of the rated load almost instantaneously as the strut is engaged.

Thus, strut based overrunning pulley designs have been disclosed herein that provide one or more of greater durability, lower heat generation, capability of carrying high torque loads, potentially tunable vibration dampening, tunable to maximum permissible torque loads before elastic (repeatable) slippage, and/or ease of end of life assessment.

While the foregoing is directed to embodiments of the present invention, other and further embodiments of the invention may be devised without departing from the basic scope thereof, and the scope thereof is determined by the claims that follow.

The invention claimed is:

1. An assembly for selectively coupling torque between rotating components, comprising:
    a shaft;
    a pocket plate disposed about the shaft and having a plurality of pockets formed on a first side thereof, wherein the shaft is rotationally coupled to the pocket plate;
    a notch plate disposed about the shaft and adjacent the pocket plate, the notch plate having a plurality of notches formed on a side of the notch plate facing the pockets of the pocket plate;
    a plurality of struts disposed in the pockets, wherein the struts are in a planar orientation and have an engagement surface perpendicular to the axis of shaft rotation;
    a resilient member disposed within the pockets and biasing the struts towards the notches;
    a drive surface rotationally coupled to the notch plate, and
    a starter motor having a solenoid connecting rod axially aligned with the shaft and selectively rotationally coupled thereto.

2. The assembly of claim 1, wherein the drive surface is configured to mesh with a flywheel of an engine.

3. The assembly of claim 1, wherein the drive surface is configured to be permanently enmeshed with an element to be driven.

4. The assembly of claim 1, wherein the drive surface is configured to be selectively enmeshed with an element to be driven.

5. The assembly of claim 4, wherein the element to be driven is a flywheel of an engine.

6. The assembly of claim 1, further comprising:
    a shift fork ring configured to axially advance or pull back the drive surface with respect to the element to be driven.

7. The assembly of claim 1, further comprising:
    an offset idler gear permanently enmeshed with an outer drive surface formed on the notch plate.

8. The assembly of claim 1, wherein the drive surface is configured to be selectively enmeshed with an element to be driven via axial extension of the solenoid connecting rod.

9. The assembly of claim 1, further comprising:
    a flywheel of an engine rotationally coupled to the drive surface, wherein the drive surface and the flywheel are configured to remain rotationally coupled before, during, and after operation of the starter motor.

10. The assembly of claim 1, further comprising:
    a flywheel of an engine selectively rotationally coupled to the drive surface, wherein the drive surface and the flywheel are configured to be rotationally coupled during starting of the engine, and uncoupled at other times.

11. The assembly of claim 1, wherein the struts further comprise a beveled edge for engaging with the notches.

12. The assembly of claim 1, further comprising:
    a housing encasing the pocket plate and the notch plate.

* * * * *